Nov. 16, 1948.   P. C. ELLIOTT   2,453,836
MACHINE FOR FORMING CONTAINERS FROM FLEXIBLE MATERIAL
Filed Nov. 7, 1941   8 Sheets-Sheet 2

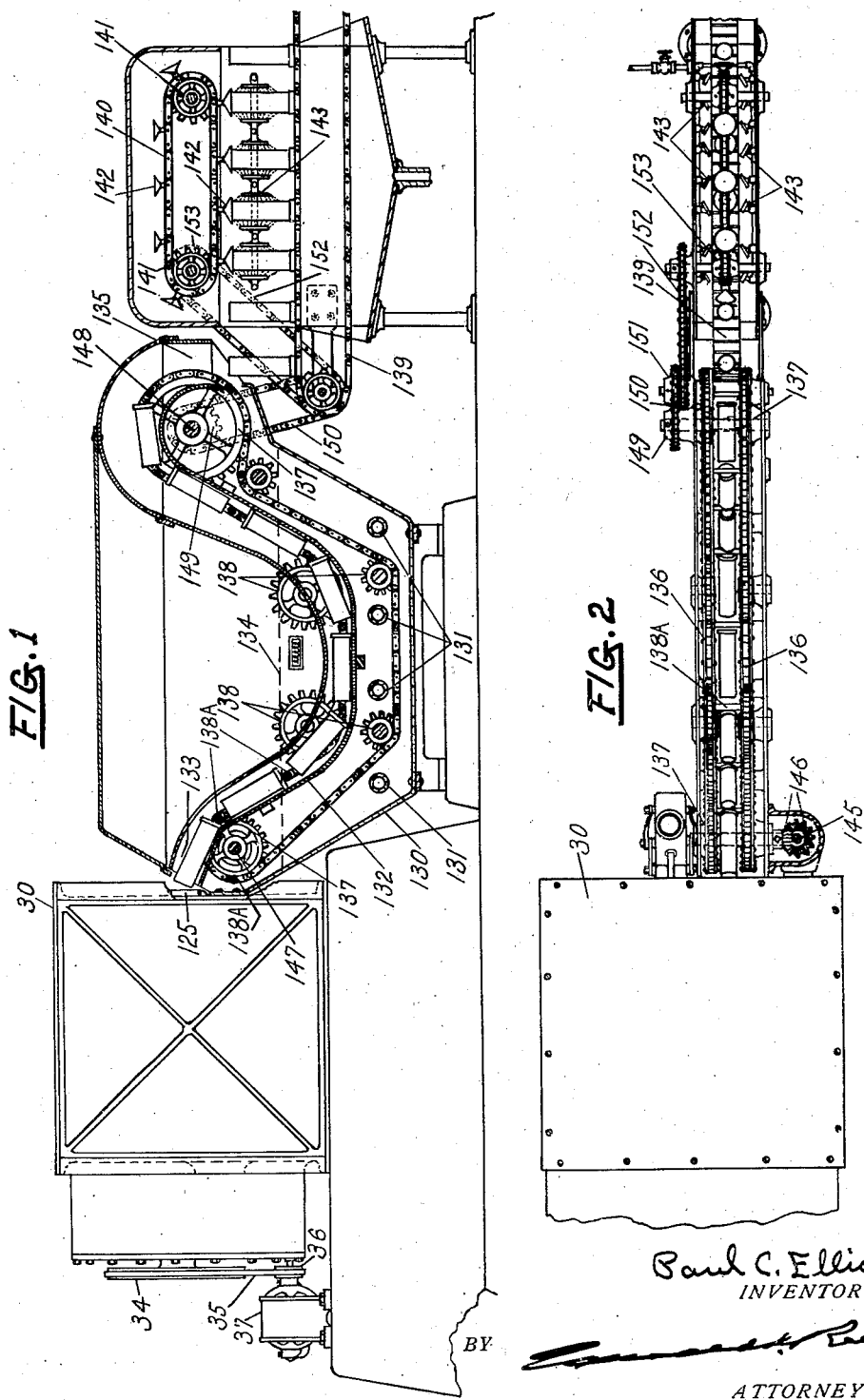

Paul C. Elliott,
INVENTOR

BY
ATTORNEY

Nov. 16, 1948.  P. C. ELLIOTT  2,453,836
MACHINE FOR FORMING CONTAINERS FROM FLEXIBLE MATERIAL
Filed Nov. 7, 1941  8 Sheets-Sheet 3

Paul C. Elliott
INVENTOR

BY

ATTORNEY

Nov. 16, 1948.  P. C. ELLIOTT  2,453,836
MACHINE FOR FORMING CONTAINERS FROM FLEXIBLE MATERIAL
Filed Nov. 7, 1941  8 Sheets-Sheet 4
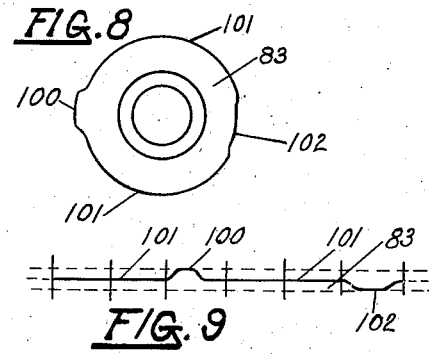
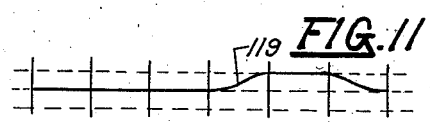
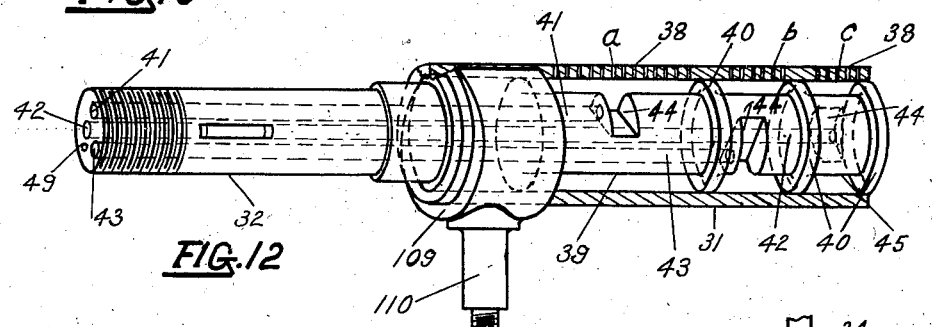
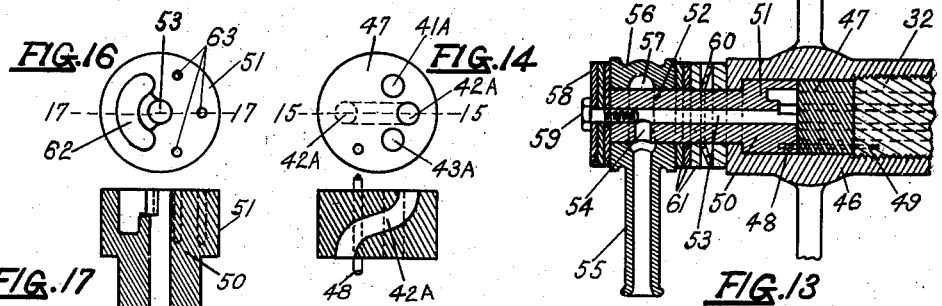
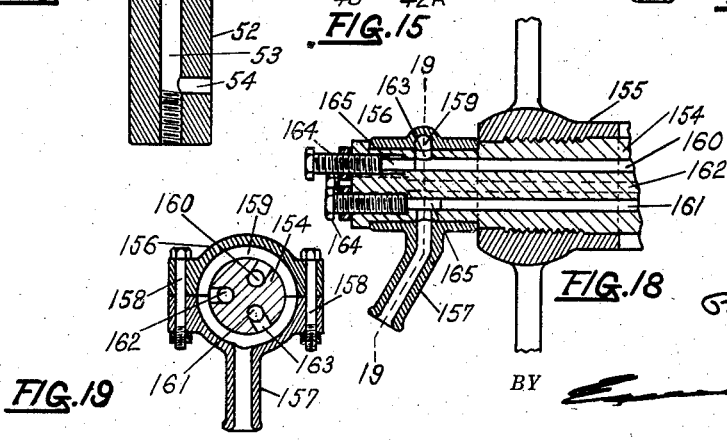
Paul C. Elliott
INVENTOR
BY
ATTORNEY Nov. 16, 1948.    P. C. ELLIOTT    2,453,836
MACHINE FOR FORMING CONTAINERS FROM FLEXIBLE MATERIAL
Filed Nov. 7, 1941    8 Sheets-Sheet 6

Paul C. Elliott
INVENTOR

BY
ATTORNEY

Nov. 16, 1948.  P. C. ELLIOTT  2,453,836
MACHINE FOR FORMING CONTAINERS FROM FLEXIBLE MATERIAL
Filed Nov. 7, 1941  8 Sheets-Sheet 7
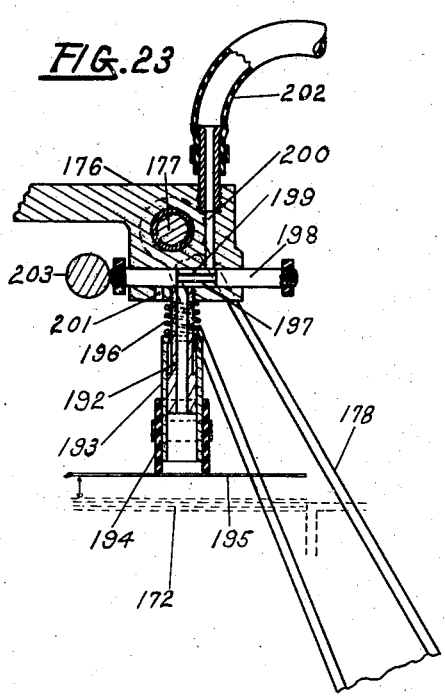
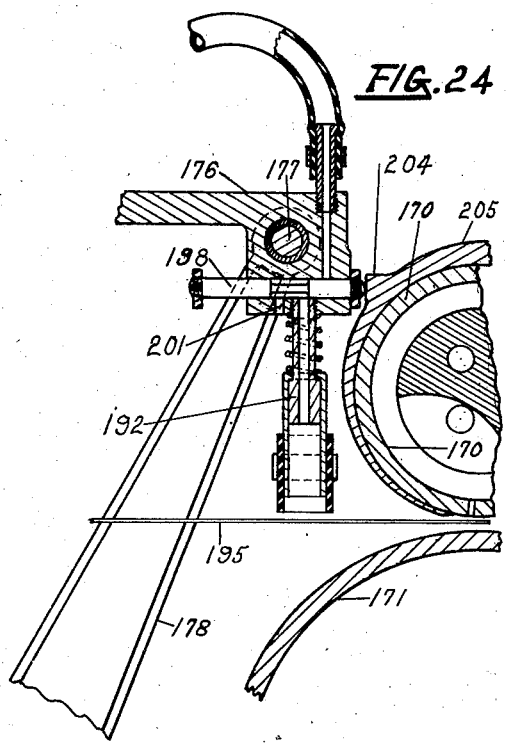
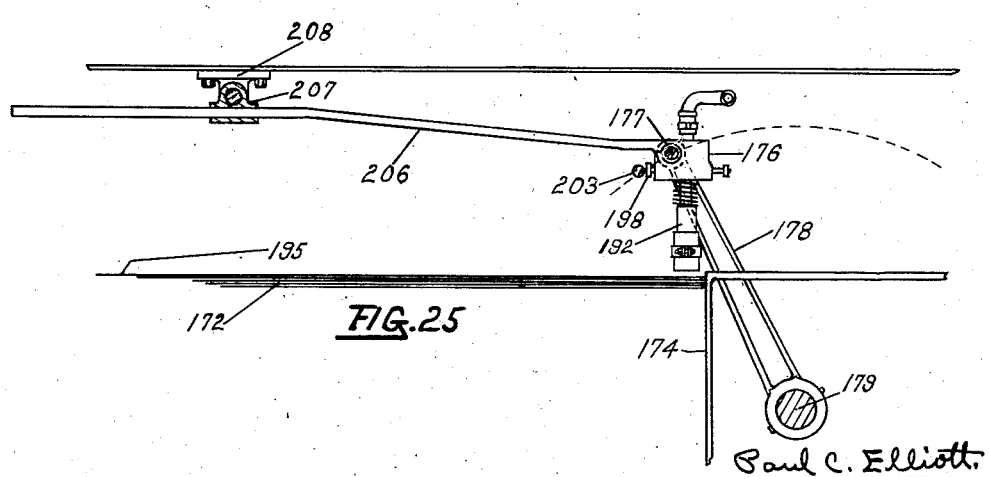
Paul C. Elliott
INVENTOR
BY
ATTORNEY

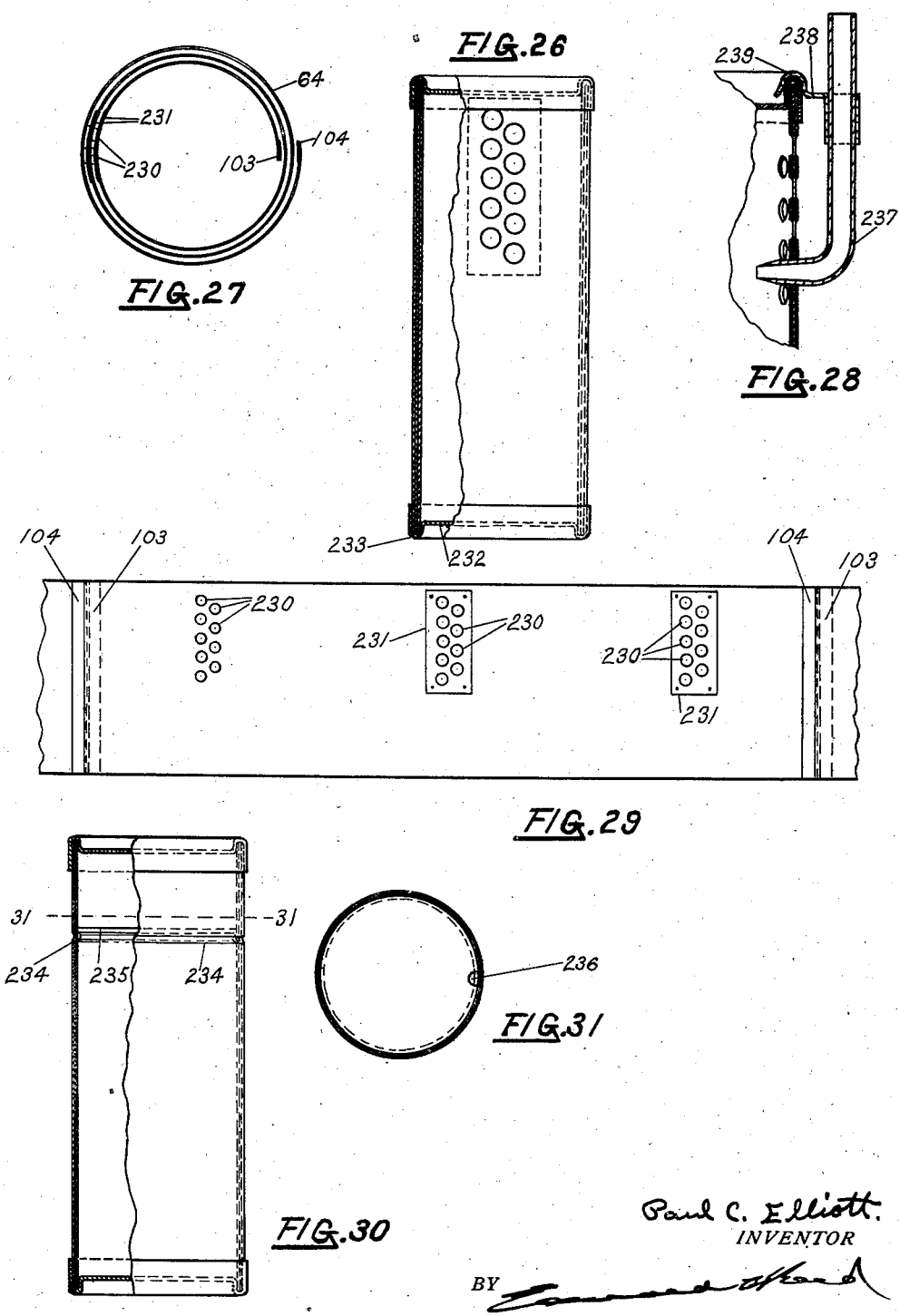

Patented Nov. 16, 1948

2,453,836

UNITED STATES PATENT OFFICE 2,453,836

MACHINE FOR FORMING CONTAINERS FROM FLEXIBLE MATERIAL

Paul C. Elliott, Dayton, Ohio, assignor to Luther K. Funkhouser, Dayton, Ohio

Application November 7, 1941, Serial No. 418,273

27 Claims. (Cl. 93—39.1)

This invention relates to a machine for making containers and more particularly to a machine for forming containers for milk or other liquids from paper or like material.

One object of the invention is to provide a machine which will automatically and accurately form successive strips of flexible material into tubular bodies to which closures may be applied.

A further object of the invention is to provide such a machine which will feed successive strips of material to a winding mechanism, wind each strip into tubular form, secure the windings in tubular form, eject the tube so formed and apply a closure thereto.

A further object of the invention is to provide a machine for forming a substantially rigid moisture proof container from thin inexpensive paper.

A further object of the invention is to provide such a machine with means for impregnating the container with wax or the like and hardening the wax preparatory to filling the container.

A further object of the invention is to provide such a machine which will be simple in construction, of small size and relatively inexpensive to build, thereby adapting the same for installation in individual milk distributing plants.

A further object of the invention is to provide such a machine which, with a minor adjustment, will operate to produce containers of different sizes on a single mandrel.

A further object of the invention is to provide an improved form of container.

Other objects of the invention may appear as the mechanism is described in detail.

Figure 4:
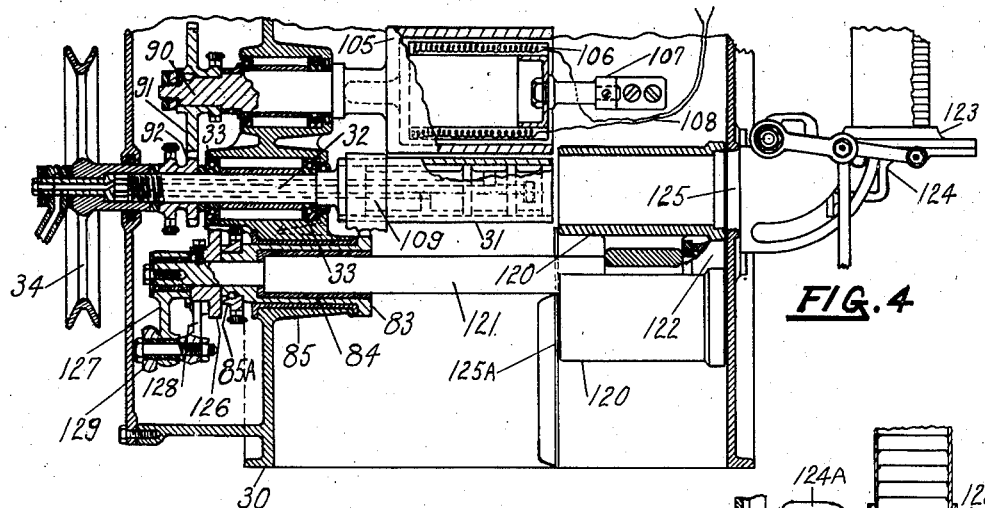
Figure 5:
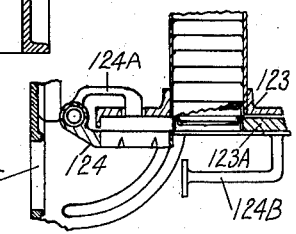
Figure 3:
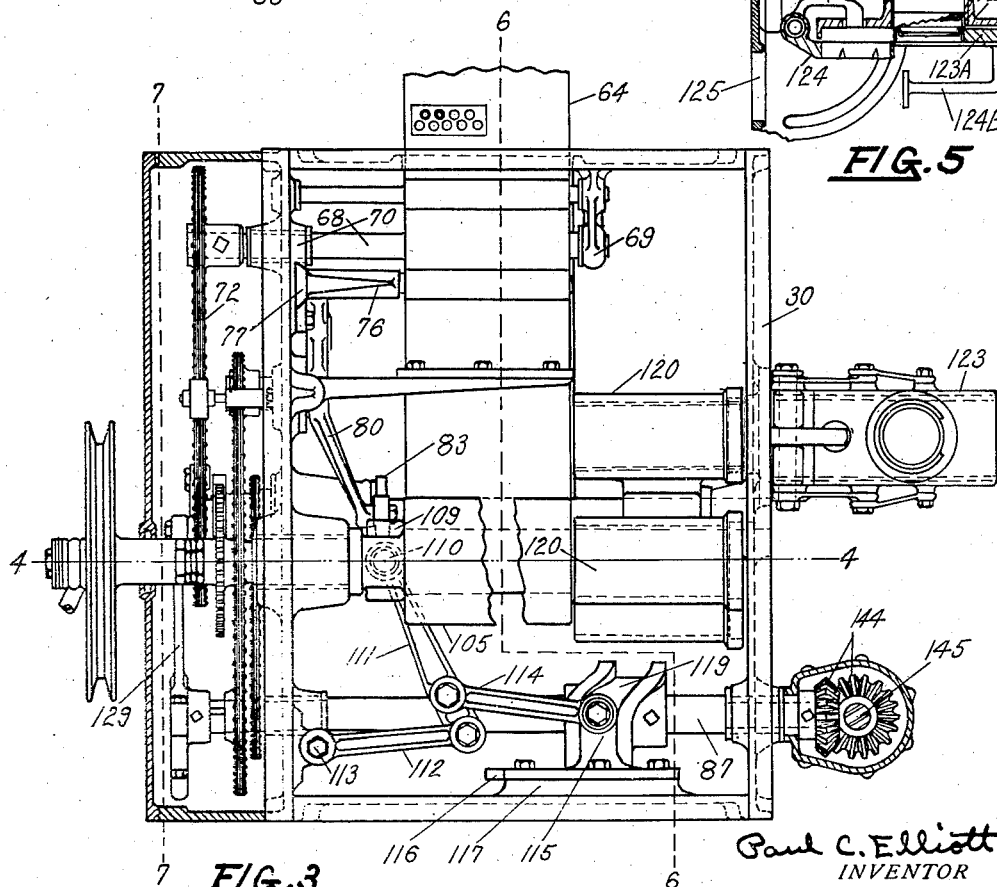
Figure 6:
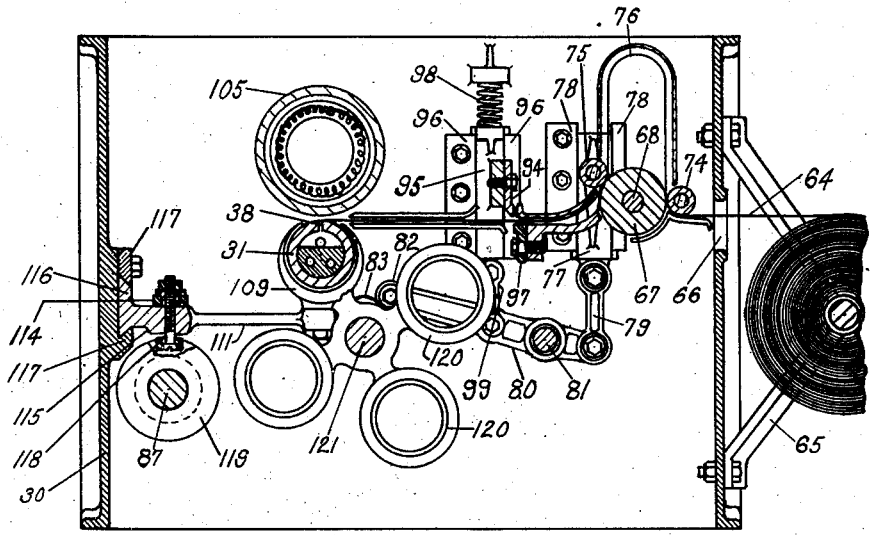
Figure 7:
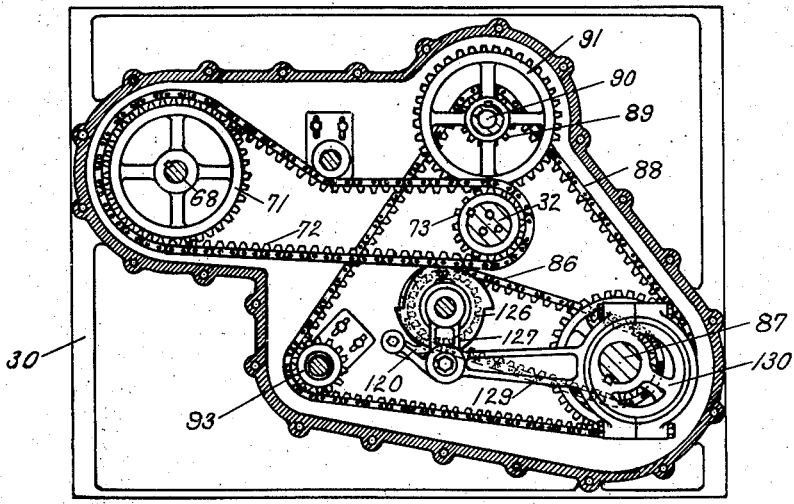
Figure 20:
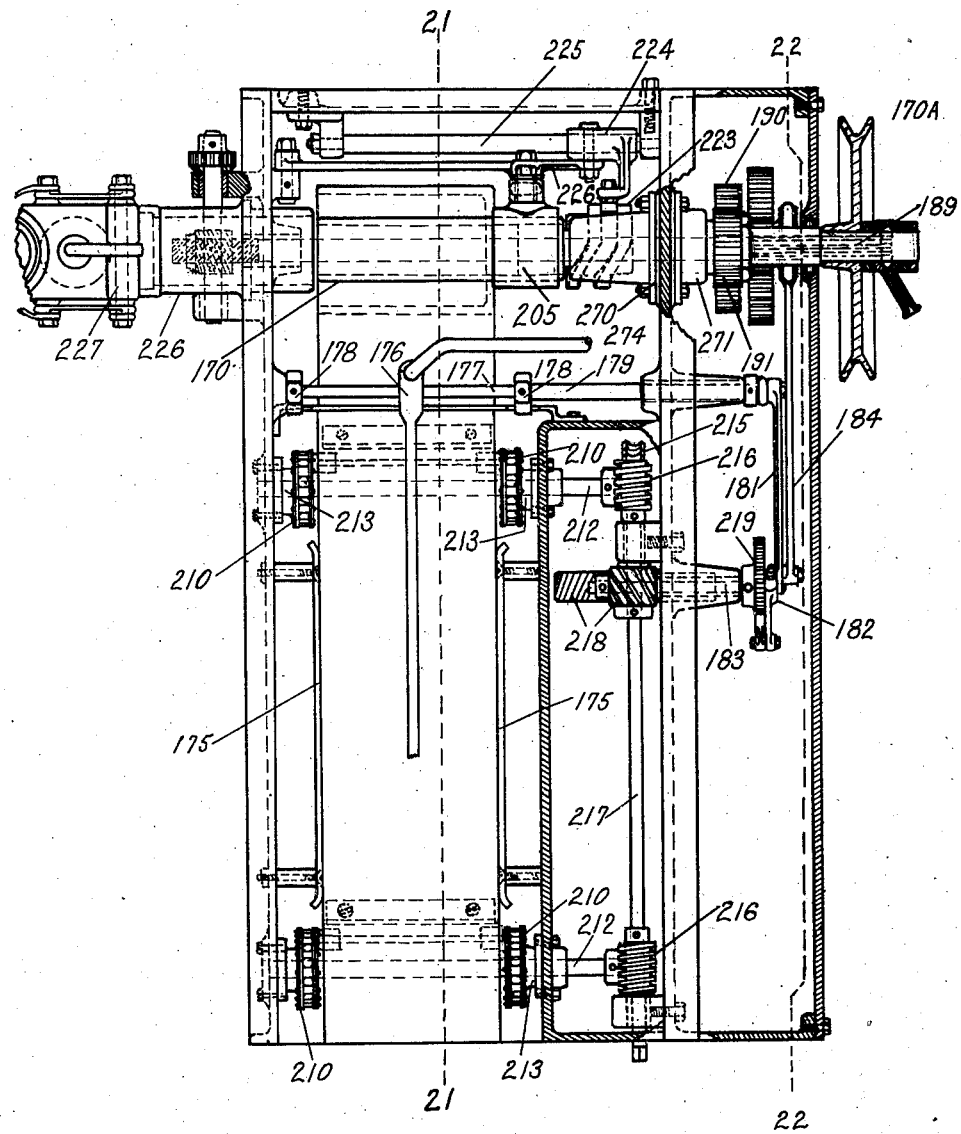
Figure 21:
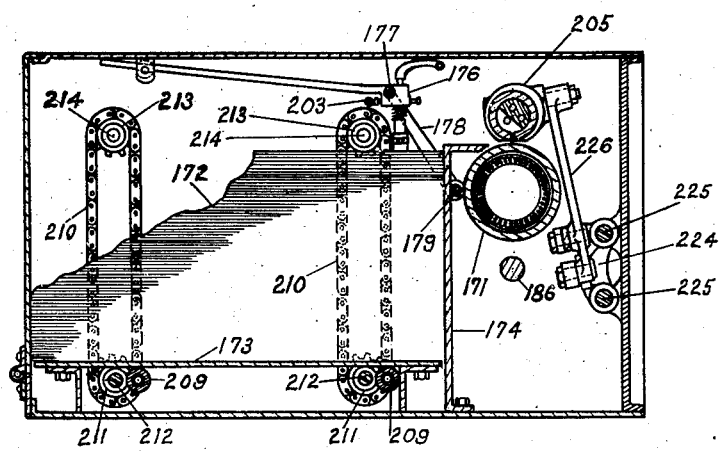
Figure 22:
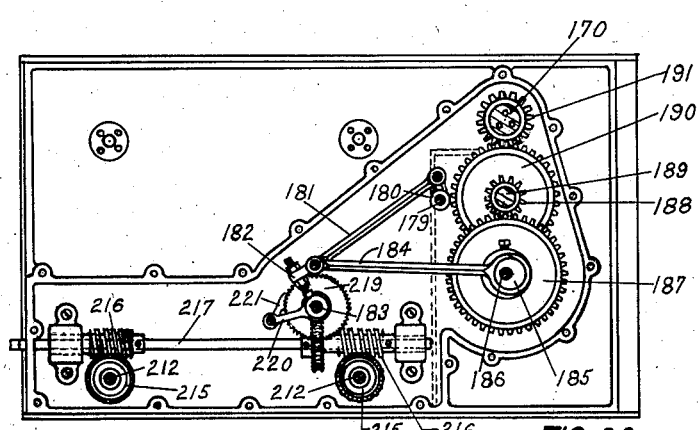
Figures 22A, 22B:
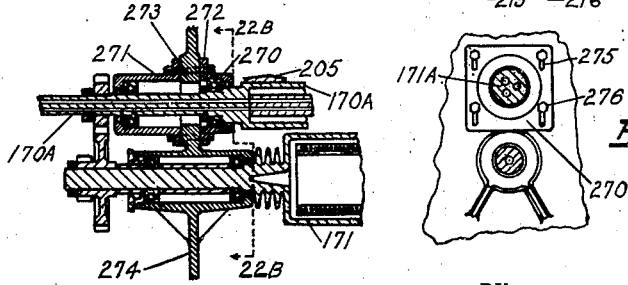

In the accompanying drawings Fig. 1 is a side elevation, partly in section, of a complete machine embodying my invention; Fig. 2 is a plan view of the mechanism shown in Fig. 1; Fig. 3 is a top plan view of the forming mechanism, partly broken away; Fig. 4 is a section taken on the line 4—4 of Fig. 3, and partly broken away; Fig. 5 is a sectional detail of a portion of a cap applying device; Fig. 6 is a section taken on the line 6—6 of Fig. 3, partly broken away and showing the receptacles for the tubes in elevation; Fig. 7 is a section taken on the line 7—7 of Fig. 3; Fig. 8 is a detail view of the cam for controlling the operations of the feeding mechanism and severing device; Fig. 9 is a development of that cam; Fig. 10 is a detail of the cam for actuating the ejector; Fig. 11 is a development of the ejector cam; Fig. 12 is a detail perspective, partly in section, of the mandrel unit; Fig. 13 is a sectional detail of the suction controlling device; Fig. 14 is an elevation of the connecting member of the suction controlling devices; Fig. 15 is a longitudinal section on the line 15—15 of Fig. 14; Fig. 16 is an elevation of the valve member of the connecting mechanism; Fig. 17 is a section taken on the line 17—17 of Fig. 16; Fig. 18 is a sectional view of a modified form of suction controlling device; Fig. 19 is a section taken on the line 19—19 of Fig. 18; Fig. 20 is a plan view of a modification of the forming mechanism; Fig. 21 is a section taken on the line 21—21 of Fig. 20, and partly broken away; Fig. 22 is a section taken on the line 22—22 of Fig. 20; Fig. 22a is a sectional detail of the bearings for the mandrel and the roller; Fig. 22b is a section taken on the line 22b—22b of Fig. 22a; Figs. 23 and 24 are detail sections of the suction head showing the same in different positions; Fig. 25 is a detail view of the suction head and its supporting and guiding element; Fig. 26 is an elevation of the container, partly in section; Fig. 27 is a diagrammatic view showing the container in transverse section with the windings separated; Fig. 28 is a sectional view of a portion of the container showing a cream removing tube applied thereto; Fig. 29 is a plan view of a strip from which the container is formed; Fig. 30 is an elevation, partly in section, of a modified form of container; and Fig. 31 is a transverse section taken on the line 31—31 of Fig. 30.

In these drawings I have illustrated one embodiment of my complete mechanism, together with a modification of the forming mechanism, but it will be understood that these embodiments have been chosen for the purpose of illustration only and that the mechanism itself may take various forms and may be utilized for producing containers or other tubular structures of various kinds.

The machine as a whole comprises three major units: first the forming units which winds the strip into tubular form and applies the closure; second, the wax bath which impregnates the formed container; and, third, the cooling and solidifying device. In the form shown in Figs. 3 to 7 the forming mechanism comprises a main frame 30 which, in the present instance, constitutes a housing in which the forming mechanism is enclosed. Mounted on this frame, and arranged within the housing formed thereby, is a mandrel, which is here shown, see Figs. 4 and 12, as comprising a winding portion, or mandrel proper, 31 having at one end thereof an extension 32 of reduced diameter which forms the mandrel shaft. This shaft is journalled in bearings 33 carried by one side member of the main frame and is connected with a suitable source of power by means of which the mandrel is continuously rotated so long as the machine is in operation. As here shown, the shaft is provided with a pulley 34 which is connected by a belt 35 with a pulley 36 on the shaft of an electric motor 37, see Fig. 1.

The mandrel 31 is provided with suitable means for gripping the end portion of a strip of flexible material, such as paper or the like, and securing said strip to the mandrel so that the continued rotation of the mandrel will wrap the strip about the mandrel to form a tubular structure. The strip is preferably of uniform width so that each winding of the tubular structure will extend for the full length of that structure. Further, I prefer to use a relatively thin paper of a more or less porous or spongy character and to wind the same about the mandrel a plurality of times so that each tubular structure will comprise a plurality of windings or plies and to thereafter impregnate the wound structure with molten wax or the like which, when cooled and hardened, will render the structure substantially rigid and absolutely impervious to liquid. Any suitable means may be utilized for gripping the strip of paper and securing the same to the mandrel but I prefer to utilize suction for this purpose and I have therefore shown the mandrel as having a longitudinal series of apertures 38 opening through the cylindrical surface thereof and connected at their inner ends with a suitable suction creating device, which may be of any suitable character and is not here shown. In order that the mandrel may be utilized for winding strips of different width and thereby producing containers of different sizes, the series of apertures may be divided into groups, each group being separately connected with the suction creating device and means being provided for so controlling said connections as to enable all or a part only of the groups to be connected with the suction creating device. The present machine is designed to form containers either of a quart size, pint size or a half pint size and therefore the series of apertures is divided into three groups, *a*, *b* and *c*. The mandrel is tubular in form and has its outer or unsupported end closed. Mounted within the mandrel and spaced from the wall thereof is an elongate member or core 39 which is provided with partitions, such as collars 40, arranged between adjacent groups of apertures to divide the interior of the mandrel into three separate compartments with which the respective groups of apertures communicate. Preferably the mandrel tube is made separate from the core and then shrunk onto the body of the core and the collars. The core 39 is provided with three separate conduits 41, 42 and 43, which are in open communication respectively with the compartments of groups *a*, *b* and *c*, communication between the conduits and the respective compartments being in the present instance provided by forming notches 44 in the core for conduits 41 and 43 and by extending conduit 42 through the tapered surface at the end of the core, as shown at 45. These conduits extend from the core through the shaft 32 and are connected with the suction line in such a way that one or more of the conduits may be disconnected from the suction line.

The means for controlling the connections between the conduits and the suction line may take various forms. In the arrangement here shown, see Figs. 13 to 17, the pulley 34 is provided with an elongate tubular hub 46 the inner end portion of which is screw threaded onto the mandrel shaft 32, the remaining portion of the interior of the tubular hub being cylindrical in form. Mounted within this cylindrical portion of the hub and abutting against the end of the mandrel shaft 32 is a connecting member or cylindrical block 47 having therein a plurality of ports 41a, 42a and 43a. At the inner end of the connecting member these ports are arranged to accurately register with the conduits 41, 42 and 43 respectively, but the conduit 42a extends diagonally through the connecting member so that on the outer side of the connecting member the ports are arranged close one to the other in substantially arcuate series, as shown in Fig. 14. A pin 48 extends through the connecting member and into an opening 49 in the end of the mandrel shaft to properly locate the ports with relation to the conduits and to hold the connecting member against displacement with relation to the shaft.

Mounted in the outer portion of the hub 46 is a member 50 which constitutes a valve member and comprises an enlarged inner portion 51 located within the hub and confined between the connecting member 47 and the end wall of the hub, and an elongate reduced portion 52 which projects beyond the hub and is provided with a single longitudinal conduit 53 which communicates through a port 54 with a nipple 55 forming a part of the suction line and adapted to be connected by a hose or other suitable conduit with the suction creating device. This nipple forms part of a fitting 56 which is rotatably mounted on the reduced portion 52 of the valve member and is provided with a circumferential channel 57 to connect the port 54 with the nipple in all positions of the mandrel shaft, it being understood that this entire connecting mechanism rotates with the shaft but the fitting 56 remains stationary. As here shown, the fitting 56 is retained on the valve member 52 by a washer 58 secured to the end of the valve member by a screw 59 and is pressed toward that washer by a resilient washer 60 acting on one or more washers 61 on the inner side of the fitting. The enlarged inner portion 51 of this valve member is provided with an arcuate groove 62 which is in open communication with the conduit 53 and is of such length and so arranged that when the valve member is in one position with relation to the connecting member 47 the groove 62 will embrace all three of the ports 41a, 42a and 43a, in the connecting member, thereby connecting all of the three groups of apertures, *a*, *b* and *c*, with the suction line. By rotating the valve member the groove can be moved out of alinement with the port 41a, thereby closing that port and cutting off group *a* of the apertures from the suction line. By further rotating the valve member the port 42a may be closed, thereby cutting off both groups *a* and *b* of the apertures and leaving group *c* only connected with the suction line. The valve member is provided with three pin holes 63 adapted to receive the pin 48 of the connecting member, the pin being inserted in a selected one of said holes according to the connection desired. In order to adjust the valve the hub 46 is partially removed from the mandrel shaft to permit the valve member to be disconnected from the connecting member 47 and rotated with relation thereto to another adjusted position. It is then again engaged with the pin 48 and the hub tightened on the mandrel shaft.

In Figs. 18 and 19 I have shown a modified form of suction controlling device. As there shown the mandrel shaft 154 extends entirely through and beyond the hub 155 of the pulley and the fitting 156, which carries the nipple 157 for connection with the suction line, is mounted about the end portion of the mandrel, it being here shown as formed in two pieces connected by bolts 158. The fitting is provided with a circumferential channel 159 which is connected with the conduits 160, 161 and 162 of the mandrel by separate radial ports 163. The conduits extend through the end of the mandrel shaft and are enlarged and screw threaded to receive screws 164, each having at its inner end an unthreaded portion 165 adapted to extend into the corresponding conduit and interrupt the connection between that conduit and the circumferential channel 159 of the fitting. The screws are separately adjustable so that any selected conduit or conduits may be cut off from the suction line.

In this embodiment of the forming mechanism a strip of material is fed to the mandrel from a web 64 which, in the present instance, is mounted, in the form of a roll, on brackets 65 carried by the main frame, the web being carried through an opening 66 in the frame to a web feeding device. This feeding mechanism may be of any suitable character and in the particular construction shown it comprises a driven feed roller 67, carried by a shaft 68, mounted in bearings 69 and 70 carried by the main frame and having secured thereto a sprocket wheel 71 which is connected by a chain 72 with a smaller sprocket wheel 73 secured to the mandrel shaft 32, and the feed roller is therefore driven by the same means which rotates the mandrel in timed relation to the mandrel but at a slower speed. Co-operating with the driven roller 68 on the receiving side thereof is a roller 74 which presses the web against the driven roller and causes the same to be fed into the machine continuously while the machine is in operation. Arranged on the other side of the driven roller is a pressure roller 75 which is supported normally in spaced relation to the driven roller so that the web is free to move with relation thereto. This pressure roller is movable into and out of cooperating relation with the driven roller and is actuated at intervals to cause the web to be fed from the pressure roller to the mandrel. That portion of the web which is fed into the machine while the pressure roller is in its idle position accumulates above the driven roller in the form of a loop, as shown at 76, to provide a slack in the web for a purpose which will hereinafter appear. The pressure roller may be movably mounted and actuated in any suitable manner. In the present instance it is carried by a shaft which is journaled on a bearing 76 carried by a slide block 77 mounted in vertical guides 78. The lower end of this slide block is connected by a link 79 with one end of a lever 80 which is pivotally mounted on a stud shaft 81 carried by the main frame. At its other end this lever is provided with a roller 82 which rides on a cam 83 which is rotated in timed relation to the rotation of the mandrel, and is here shown as carried by the inner end of a sleeve 84 which is rotatably mounted in a bearing 85 on the main frame and has secured thereto, on the outer side of the main frame, a sprocket wheel 85a which is driven by a chain 86 from a sprocket wheel on a shaft 87. The shaft 87 is driven by a chain 88 from a sprocket wheel 89 secured to a shaft 90 which carries a gear 91 which meshes with a pinion 92 on the mandrel shaft 32. To avoid interference with other parts of the mechanism this chain 88 is also carried about an idle sprocket wheel 93 so that the chain travels in a substantially triangular course. Thus the cam 83 is rotated in timed relation to the rotation of the mandrel and actuates the pressure roller 75 to cause the latter to press the web into feeding engagement with the driven feeding roller 67, thereby causing the end portion of the web to be advanced to the mandrel. After the web has been advanced the distance necessary for this purpose the pressure roller is moved out of engagement therewith, thereby releasing the web and interrupting the movement of the inner end portion thereof by the feeding device.

Arranged between the feeding device and the mandrel is a web severing device which, as here shown, comprises a cutter 94 carried by a slide bar 95 slidably mounted in upright guides 96 and cooperating with a cutter bar 97. A spring 98 acting on the upper end of the slide bar tends to move the cutter downwardly, that is, toward the web. The lower end of the slide bar 95 is connected by a link 99 with the lever 80, the connection being such that when the roller 82 of the lever is in contact with the lobe 100 or either concentric surface 101 of the cam 83 (see Fig. 8) the cutter will be supported above the path of the web, but when the roller enters the recess 102 in the cam the spring will move the cutter across the path of the web and thus sever the web. The action of the pressure roller on the web causes the forward end of the web to be moved to a position overlapping the mandrel and as soon as the web reaches this position the pressure roller is elevated to interrupt the movement of the inner end portion of the web by the feeding device and to release the web for movement with relation to the driven roller 67. As soon as the suction apertures 38 are moved into underlying or operative position relative to the web the end of the latter will be gripped to the mandrel and the continued rotation of the mandrel will wind the web about the same. When a predetermined amount of the web has been wound on the mandrel, in the present instance approximately two windings, the cam will release the cutter and the latter will be actuated by its spring 98 to sever the web, the line of severance being spaced from the mandrel such a distance that that portion of the web, which now constitutes a separated strip, lying between the cutter and the mandrel, will complete the desired number of windings in the tube, in the present instance three windings. It will be obvious that the cam 83 rotates at a much slower speed than the mandrel. In the present instance the mandrel makes six rotations for each rotation of the cam, the first three of these rotations serving to wind the strip about the mandrel, and the ejecting operation taking place during the remaining three rotations, as will be hereinafter explained. As has been explained, the speed of the mandrel is considerably in excess of that of the driven feeding roller 67 and as the web is wound onto the mandrel it is drawn from the loop of slack material above the driven roller.

The windings of the tube must of course be pasted or otherwise attached one to the other to retain the strip in its wound form. In the present instance the adhesive is applied to the material independently of the machine itself and the material comes to the machine with the adhesive in a dry condition. Preferably the end portions only of the strip are attached to the adjacent windings and, as here shown in Figs.

27 and 29, adhesive is applied to the upper surface of the forward end portion of the strip, as shown at 103, and to the lower surface of the rear end portion of the strip, as shown at 104, so that when the strip is wound to tube form the adhesive will lie between the respective end portions thereof and the adjacent windings. When the material is in web form transverse lines of adhesive are applied to the web at intervals, and the feeding of the web is so timed that it will be severed between adjacent lines of adhesive, as shown in Fig. 29. Means are provided for softening the adhesive when the strip has been wound to tube form and causing it to adhere to adjacent windings. Preferably a heat soluble adhesive is employed and a suitable heating element cooperates with the mandrel to soften the same. In the arrangement shown a heated roller 105 is supported by the shaft 90 adjacent to the mandrel and is spaced from the mandrel such a distance that it will not interfere with the feeding of the strip to the mandrel but will engage the outer winding of the tube when the strip is fully wound, thereby heating and softening the adhesive. This roller may be heated in any suitable manner but, as here shown, it is tubular in form and a heating element 106 is supported within the same by a bracket 107, the heating element being held against rotation and being connected with a suitable source of current by conductors 108.

When the tube has been formed and the windings attached one to the other it is moved lengthwise off the mandrel, the outer end of the mandrel being unsupported to permit of the removal of the tube. This removing or ejecting device may be of any suitable character and it is here shown as a split collar 109, having its longitudinal edges spaced one from the other, see Figs. 6 and 12. This collar is mounted about the mandrel for reciprocatory movement lengthwise thereof and in the form here shown is provided with a pivot stud 110 with which is connected one end of a lever 111, the other end of the lever being pivotally connected to the end of an arm 112 pivotally mounted on the side member of the main frame at 113. Pivotally connected with the lever 111, between the stud 110 and the arm 112 and adjacent to the latter, is an arm 114 which is pivotally mounted at its other end on a bracket 115 which is rigidly secured to a slide block 116 mounted in horizontal guides 117 on the end member of the main frame. Secured to the bracket 115 is a stud 118, preferably provided with a roller, which extends into the peripheral groove of a cam 119 which is rigidly secured to the shaft 87. The cam groove is so shaped, see Figs. 3, 10 and 11, that it will impart an oscillating movement to the lever 111 and thus move the ejecting collar 109 lengthwise of the mandrel to eject the tube and then restore the ejector to its initial position. The movement of the shaft 87 is so timed that the movement of the ejector will begin immediately following the completion of the winding of the tube. The next succeeding strip of material is fed to the mandrel during the operation of the ejector and the latter will be moved to its initial position just prior to the time that the suction apertures in the mandrel move into operative relation to the overlying end of the strip. Thus the ejector in no way interferes with the feeding of the strip and the successive operations may be effected in rapid succession.

A receptacle is provided at the end of the mandrel to receive the ejected tube and support the same while the closure is being applied thereto. In that form of the apparatus shown in Figs. 3 to 7 a plurality of tubular receptacles 120 are employed for this purpose and they are adapted to be moved successively into alinement with the mandrel. Preferably the several receptacles, of which four are shown, are mounted on a shaft 121, which is rotatably mounted at one end in the sleeve 84, which carries the cam 83, and is journaled at its other end in a bearing 122 on the frame. The shaft 121 is operated intermittently to move the receptacles 120 successively into line with the mandrel and support the same in stationary positions while the tube is being discharged from the mandrel. When the tube has been discharged into one of the receptacles the next movement of the shaft carries that receptacle out of line with the mandrel and while the receptacle, with the tube therein, is supported in a succeeding stationary position, in the present instance its fourth position, a closure applying device applies a closure thereto. The closure applying device is here shown as of a known construction and need not be described in detail. Suffice it to say that the closure is in the form of a cap and a stack of these caps is carried by a suitable support 123. An ejector 123a moves the lowermost cap of the stack into a position above the carrier member 124 into which it is pressed by a pivoted arm 124a and is then moved by the carrier into line with the opening 125 in the frame which is in line with the receptacle and tube. A plunger 124b then engages the cap and presses the same onto the end of the tube and is then retracted. A wall 125a overlaps the inner end of the receptacle so as to hold the tube against inward movement by the plunger. After the cap applying member has been withdrawn the receptacle moves from its fourth position to its first position, in line with the mandrel, and the next tube discharged from the mandrel engages the closed tube in the receptacle and discharges the latter through an opening 125 in the frame. The shaft 121 which carries the receptacles may be operated in timed relation to the mandrel in any suitable manner. In the present instance this shaft has a reduced portion extending beyond the sleeve 84 and secured to this reduced portion of the shaft is a four toothed ratchet wheel 126. Rotatably mounted on the reduced end portion of the shaft is a rock arm 127 which carries a pawl 128 arranged to act upon the ratchet wheel. Also connected with the arm 127 is one end of a pitman 129 having at its other end a bearing which is mounted upon an eccentric disk 130 carried by the shaft 87. The throw of the eccentric is such that upon each rotation thereof the pawl 128 will be moved into engagement with a tooth of the ratchet wheel 126 and then actuated to rotate that ratchet wheel through a quarter rotation. The shaft 87 is timed to make one complete rotation during the time required to wind a strip on the mandrel and to eject the tube so formed and the eccentric is so arranged that the ratchet wheel 126 and its shaft 121 will be actuated immediately following the discharge of the tube into the receptacle which is in line with the mandrel.

After the closed tube is discharged from the receptacle 120 it is immersed in a bath of molten wax or the like which permeates and thoroughly impregnates the several windings of the tube. This may be accomplished in any suitable manner but, as here shown, there is arranged just beyond the forming mechanism a tank 130 adapted to contain a suitable wax, such as paraffin or a paraffin composition, and provided with one or more heaters 131, here shown as electrical heaters, to melt the wax and maintain the same at the proper temperature. Arranged in this tank is a guideway 132 the forward end 133 of which extends above the level of the wax, shown at 134, and is arranged in line with the opening 125 in the frame of the forming mechanism so that the tube when discharged from the receptacle 120 will pass into the guideway 132 with its closed end foremost. The guideway extends down through the bath of wax, thence upwardly above the bath and preferably has its rear or discharge end 135 turned downwardly. A suitable conveyor is provided to engage the successive tubes and carry them through this guideway and, as here shown, this conveyor comprises parallel chains 136 arranged on opposite sides of the guideway 132 and supported by sprocket wheels 137 near the respective ends of the guideway, idle sprocket wheels 138 serving to hold the intermediate portion of the conveyor chains in proper relation to the submerged portion of the guideway. The two chains for the conveyor are connected by cross bars 138a which are spaced apart a distance slightly greater than the length of the longest tube the machine is designed to make. When the tube is discharged into the guideway it will move down the upper inclined portion thereof by gravity and the rear end of the tube will be engaged by a cross bar 138a of the conveyor which will carry the tube through the full length of the guideway. When the tube is submerged in the bath it will of course be completely filled with molten wax and as it is carried upwardly out of the bath with the closed end upward the wax will drain therefrom so that as the tube passes through the discharge opening 135, with the closed end downward, there will be no free wax within the same.

After the tube or container has thus been impregnated with wax it is subjected to the action of a cooling device to quickly cool and harden the wax preparatory to delivering the container to filling mechanism. In the present instance this cooling device comprises a conveyor 139, the upper stretch of which travels in a horizontal plane and is arranged to receive the tube from the discharge opening 135 of the guideway 132 and support the same in an upright position. Mounted above the conveyor 139 is a sprocket chain 140, which travels about sprocket wheels 141 and is provided with a series of concave members 142 spaced apart distances corresponding to the distances between successive containers on the conveyor 139 and adapted to engage and tightly close the upper ends of the containers or tubes as these travel through the cooling device. Arranged on opposite sides of the conveyor 139 are two series of spray heads 143 by means of which a cooling medium, such as cold water, is discharged against all sides of each container, the temporary closures 142 preventing this water from entering the containers. The conveyor 139 extends beyond the cooling device and is adapted to carry the cooled containers either directly to a filling and capping apparatus or to another conveyor which in turn will carry them to a filling and capping apparatus. Inasmuch as this filling and capping apparatus forms no part of the present invention it is not here illustrated.

The conveyors for the wax bath and the cooling device are of course operated in timed relation to the movable parts of the forming apparatus. As shown in Fig. 3 the shaft 87 is connected by beveled gearing 144 with an upright shaft 145, the upper end of which is connected by beveled gearing 146 with a shaft 147, which carries the front sprocket wheels 137 for the conveyor chains. The conveyor chains of course rotate the rear sprocket wheels 137 and the shaft 148 of these rear sprocket wheels is provided with a smaller sprocket wheel 149 which is connected by a sprocket chain 150 with a sprocket wheel 151 which drives the conveyor 139 for the cooling device. A second sprocket wheel 151a rotatable with the sprocket wheel 151 is connected by a chain 152 with a sprocket wheel 153 which drives the chain 140 to move the caps 142 into engagement with the containers on the conveyor 139.

Thus it will be apparent that not only is the apparatus of such a character that it may be operated at a high speed to produce containers at a very low cost but that the material does not come in contact with human hands and the container as delivered from the cooling device is sterile and liquid tight.

While I have hereinbefore shown and described the forming apparatus as utilizing a continuous web of material it will be obvious that preformed strips may be utilized instead of the web and this is in some respects preferable to the use of the web. In Figs. 20 and 25 I have illustrated a forming mechanism which is provided with means for feeding successive strips to the mandrel from a pile of preformed strips, but which in other respects is very similar to the forming mechanism hereinbefore described. As shown in these figures the mandrel 170 is similar in construction and operation to the mandrel above described. The heated roller 171 is similar to and operates in the same manner as the heating roller 105 but is here shown as arranged below the mandrel instead of above the same. Means are provided for supporting a pile 172 of preformed strips in advance of the mandrel, these strips being here shown as mounted on a vertically movable supporting member 173 and as having their forward ends in contact with an upright plate 174 to maintain the ends of the several strips flush one with the other, and side members or guides 175 which are also provided to maintain the strips in proper positions with relation one to the other.

Suitable means are provided for separating the uppermost strips from the pile of strips and moving the forward end portion of that strip to the mandrel. In this instance the end of the strip is placed beneath the mandrel instead of above the same. This strip feeding means is preferably suction operated and, as here shown, comprises a suction head 176 carried by a shaft 177 which is supported by rock arms 178 which in turn are mounted on a shaft 179. Oscillating movement is imparted to the shaft 179 to cause the arms 178 to carry the suction head first into engagement with the uppermost strip of the pile of strips and then forwardly to cause it to carry said uppermost strip to the mandrel. For this purpose the shaft 179 is provided with a crank arm 180 which is connected by a rod 181 with a rock arm 182 mounted on a shaft 183. The rock arm 182 is connected by a pitman 184 with an eccentric 185 on a shaft 186. A gear 187 secured to the shaft 186 meshes with a pinion 188 on a shaft 189 to which is secured a gear 190 which meshes with a pinion 191 on the mandrel shaft so that the shaft 187 is rotated in accurately timed rotation to the mandrel and will actuate the suction head at proper times with relation to the operation of the mandrel.

The suction head 176 is provided with a downwardly extending rigid conduit 192 on which is slidably mounted a sleeve 193 having at its lower end a yieldable portion 194 which is here shown as a section of yieldable material clamped to the lower end of the sleeve and adapted to engage the uppermost sheet 195 of the pile of sheets. A spring 196 acts on the sleeve to press the same into engagement with the strip. At its upper end the conduit 192 is in open communication with a transverse bore 197 in the suction head, which bore constitutes a valve chamber and in which is slidably mounted a valve member 198 having a circumferential port 199 adapted to connect the conduit 192 either with a suction conduit 200 or with an exhaust conduit 201. The suction conduit is provided with suitable means, such as a flexible hose 202, for connecting the same with a suction creating device. The valve 198 projects beyond the opposite sides of the suction head and is adapted to engage and to be actuated by suitable fixed stops on the machine. In the present instance a transverse rod 203 is located above the pile of sheets to engage the valve just before the suction head contacts the uppermost strip of the pile, thereby closing the exhaust port and connecting the conduit 192 with the suction line. The suction thus created in the sleeve 193 causes the strip to be gripped to the suction head and as that head is moved forwardly the strip is carried forward and its end portion is inserted beneath the mandrel 170. As the strip approaches its operative position with relation to the mandrel the valve 198 contacts with a shoulder 204 on the ejector collar 205 which causes the valve to be shifted to disconnect the conduit 192 from the suction line and to connect the same with the exhaust port 201, thereby releasing the strip 195 and permitting the same to move with relation to the suction head. Preferably a guide is provided to maintain the suction head upright as it travels from one position to another and, as here shown, a guide rod 206 is secured to the suction head, extends forwardly above the pile of strips and is slidably mounted in a short sleeve 207 which is pivotally mounted on the top wall 208 of the housing which encloses the pile of strips.

The adjustable support 173 for the pile of strips is moved upwardly as the strips are removed therefrom so as to maintain the uppermost strip at substantially the same level at all times regardless of the number of strips in the pile. For this purpose the supporting member 173 is carried by cross bars 209 each of which is supported at its ends by sprocket chains 210 on opposite sides of the pile of strips, these sprocket chains extending about sprocket wheels 211 mounted on transverse shafts 212 arranged beneath the supporting member 173, and also about sprocket wheels 213 carried by short shafts 214 arranged above the pile of sheets and supported by frame members on opposite sides of the pile. Each of the shafts 212 has secured thereto a worm wheel 215, which worm wheels mesh respectively with worms 216 on a shaft 217 extending lengthwise of the pile. This shaft 217 is connected by helical gears 218 with the shaft 183 which carries the rock arm 182. Rigidly secured to the shaft 183 is a ratchet wheel 219 and pivotally mounted on that shaft and rigidly connected with the rock arm 182 is an arm 220 which carries a pawl 221 which in turn engages the ratchet wheel 219. Thus each oscillation of the rock arm 182 by the eccentric 185, to move a strip from the pile to the mandrel, will cause the strip supporting member 173 to be moved upwardly a distance corresponding approximately to the thickness of the strip which is removed.

The ejector 205 is operated from a cam 223 on the shaft 186 in substantially the same manner as described in connection with Figs. 3 to 7, but in this case the cam actuating bracket 224 is slidably mounted on a pair of rods 225 and the actuating lever 226 and its associated arms are arranged in upright positions instead of horizontal. Further, in this form of the device a single receptacle 226a is mounted in a fixed position in line with the mandrel to receive the finished tube therefrom and the closure applying device 227 operates on the tube while it is in the receptacle 226a, the operation being completed and the cap applying element moved out of line with the receptacle prior to the discharge of a succeeding tube and that succeeding tube ejects the closed tube from the receptacle and delivers the same to the wax bath as hereinbefore described.

It may be desirable to mount the mandrel and the heating roller for adjustment with relation one to the other to accommodate the same to materials of different thicknesses and this may be accomplished by mounting one or both of these members in adjustable bearings. As shown in Fig. 22a the mandrel shaft 170a is mounted in a vertically adjustable bearing which is here shown as comprising two roller bearing units or boxes 270 and 271 having flanges 272 and 273 by means of which they may be secured to the respective sides of the supporting frame member 274. In the construction shown each flange is provided with a plurality of vertical slots 275 and bolts 276 extend through the corresponding slots of the two bearing units and through the frame member to rigidly connect the bearing units to the frame member in alinement one with the other. The inclined actuating lever 226 which forms a part of the connection between the cam and the ejecting device causes the latter to move lengthwise of the mandrel a distance sufficient to permit of its vertical movement with the mandrel and to thus automatically accommodate the actuating device to the changed position of the mandrel. Obviously if a similar adjustment is to be provided for in the winding mechanism of the web feed type it would be more convenient to make the heating roller adjustable with relation to the mandrel, by providing the same with adjustable bearings similar to those here described.

When the container is to be used for milk it is desirable that it should be provided with means for indicating the cream line. For this purpose the strips of paper supplied to the machine are provided with a plurality of series of windows so arranged that when the strip is wound into tube form the windows of the respective series will be in line one with the other. As shown in Figs. 26, 27 and 29, each series of windows comprises two lines of holes 230 formed through the paper and arranged in staggered relation one to the other. These adjacent series of holes are spaced one from the other distances determined by the diameter of the tube which is to be formed and by the thickness of the material of the strip so that when the tube is wound each hole of each series will register with the corresponding hole of each of the other series. Each series of holes except the last series is provided with a covering of transparent material 231 which may be pasted or otherwise secured to the strip, so that when the strip is wound into tubular form these sections of transparent material will lie between adjacent windings and will tightly close the window openings without obstructing the vision. The wax bath through which the container is passed will of course coat these windows but inasmuch as the wax itself is transparent the cream line will still be visible through the windows. The closure or cap 232 which is applied to the end of the formed tube, as shown in Fig. 26, is preferably provided with a circumferential groove 233 adapted to receive the end of the wound tube, the walls of this groove overlapping and being pasted or otherwise tightly secured to both the inner and outer surfaces of the tube so as to provide a very strong leak proof closure. Preferably the interior surface of the groove is coated with a heat soluble adhesive and the closure applying element is heated so that the closure may be applied with a minimum of pressure on the tube. Only one closure is applied by the machine here described but the second or upper closure which is applied after the container is filled is substantially identical with the closure 232.

The window openings in the container not only serve to indicate the cream line but by puncturing the transparent material of the window a selected opening may be used as a pouring opening to remove the cream. To facilitate the removal of the cream a tube may be inserted through the selected window opening. As shown in Fig. 28, a tube 237 has its end portion bent at an angle thereto and tapered to facilitate its insertion through the window opening. This tube may be supported on its container in any suitable manner but, as here shown, a connecting member 238 is slidably mounted on the tube and provided with a hook shaped portion 239 to engage over the upper edge of the container.

In Figs. 30 and 31 I have shown a tube similar to that above described except that it is provided adjacent the cream line with an inwardly extending bead 234 on which is mounted a disk-like partition 235 which provides the interior of the container with upper and lower compartments, the partition being provided near the edge thereof with an opening or openings 236 to permit the cream to rise to the upper side of the disk. By tilting the container so that the opening or openings 236 will be at the upper side thereof the cream may be poured out of the upper compartment without any milk being poured from the container. If desired, the opening 236 in the partition may be omitted and a solid partition used, thus dividing the container into two compartments which may be separately filled with cream and with milk from which the cream has been removed. When thus used neither closure will be applied to the container when it is formed but the closures will be applied after the respective compartments have been filled.

While I have shown and described one embodiment of my invention, together with a modification thereof I wish it to be understood that I do not desire to be limited to the details thereof as various modifications may occur to a person skilled in the art.

Having now fully described my invention, what I claim as new and desire to secure by Letters Patent is:

1. In a machine for forming a tubular structure from flexible material, a mandrel, means for rotating said mandrel continuously during the operation of the machine, means for feeding strips of material successively to said rotating mandrel at spaced intervals, said mandrel having means for gripping the forward end of each strip and causing said strip to be wound about said mandrel to form a tube, means acting on the tube on said mandrel to cause windings thereof to adhere one to the other, an ejector, and means operating in timed relation to said rotating means to cause said ejector to remove the tubes from said mandrel and to return said ejector to its initial position, said feeding means being timed to present the forward edge of a succeeding strip to said mandrel during the movement of said ejector.

2. In a machine for forming a tubular structure from flexible material, a mandrel having a plurality of apertures arranged in longitudinal series, and means for connecting said apertures with a suction creating device, said connecting means comprising a plurality of conduits each connected with a part only of said apertures, and means for disconnecting one or more of said conduits from said suction creating device.

3. In a machine for forming a tubular structure from flexible material, a hollow mandrel having a plurality of apertures arranged in longitudinal series and divided into a plurality of groups, means within said mandrel for separating said groups of apertures one from the other, separate conduits communicating with the respective groups of apertures and adjustable means for connecting all or a part only of said groups of apertures with a suction creating device.

4. In a machine for forming tubular structures from flexible material, a mandrel, means for rotating said mandrel, said mandrel having means for gripping a strip of material and causing the same to be wound about said mandrel to form a tube, a plurality of receptacles mounted adjacent one end of said mandrel and movable successively into alinement with said mandrel, means for moving a tube from said mandrel into that receptacle which is alined therewith, means for intermittently actuating said receptacles, and means for applying a closure to the outer end of said tube after its receptacle has been moved out of line with said mandrel, said closed tube remaining in said receptacle until the latter is again moved into alinement with said mandrel, whereby a succeeding tube moved from said mandrel into said receptacle will eject the closed tube therefrom.

5. In a machine for forming tubular structures from flexible material, a mandrel, means for rotating said mandrel, said mandrel having means for gripping a strip of material and causing the same to be wound about said mandrel to form a tube, a structure mounted for rotation about an axis parallel with said mandrel, a plurality of receptacles carried by said structure, means for actuating said structure in timed relation to said mandrel to move said receptacles successively into alinement with said mandrel, a closure applying device mounted adjacent one of said receptacles which is out of alinement with said mandrel to apply a closure to one end of the tube in said receptacle, and a single device for moving a tube from said mandrel into that receptacle which is in alinement therewith and for ejecting the tube to which the closure has been applied.

6. In a machine for forming tubular structures from flexible material, a mandrel, means for rotating said mandrel, a web feeding device having means for maintaining a loop of slack material in the web and having means to engage the web beyond said loop, feed the forward end thereof to said mandrel and then release said web, said mandrel having means to grip said web and wind the same about said mandrel, and means operating in timed relation to said rotating means to sever said web on a line in advance of said mandrel when a predetermined amount of said web has been wound on said mandrel.

7. In a machine for forming tubular structures from flexible material, a mandrel, means for rotating said mandrel, a web feeding device comprising a driven roller and a pressure roller movable toward and from said driven roller, means operating in timed relation to said rotating means for moving said pressure roller into engagement with the web on said driven roller, maintaining said engagement until the forward end of the web has been moved to said mandrel and then moving said pressure roller out of engagement with said web to interrupt the movement of said web thereby and to release said web, said mandrel having means to grip said end of said web and cause said web to be wound about said mandrel, a severing device arranged to sever said web between said feeding device and said mandrel, and means operating in timed relation to said rotating means to actuate said severing device when a predetermined amount of said web has been wound on said mandrel.

8. In a machine for forming tubular structures from flexible material, a mandrel, means for rotating said mandrel continuously while said machine is in operation, a main feeding roller, means for continuously rotating said roller, a roller at one side of said main roller and cooperating therewith to withdraw the web from a roll of material, a pressure roller supported normally in an inoperative position at the other side of said main roller, a cam, means for rotating said cam in timed relation to the rotation of said mandrel, means controlled by said cam to move said pressure roller into engagement with the web on said roller to advance the forward end thereof to said mandrel and to then move said pressure roller from said main roller to release said web, said mandrel having means to grip said end of said web and cause the web to be wound about said mandrel, a cutter arranged to sever the web between said mandrel and said feeding rollers, and means controlled by said cam to actuate said cutter when a predetermined amount of said web has been wound on said mandrel.

9. In a machine for forming tubular structures from flexible material, a mandrel, means for rotating said mandrel, means for supporting a pile of strips of flexible material adjacent to said mandrel, means operating in timed relation to said rotating means for feeding a single strip from said pile of strips to said mandrel, said mandrel having means to grip the end of said strip and cause said strip to be wound about said mandrel to form a tube, means for causing adjacent windings of said tube to adhere one to the other, an ejector, and means for actuating said ejector to remove said tube from said mandrel and to restore said ejector to its initial position while said strip feeding device is moving another strip to said mandrel.

10. In a machine for forming tubular structures from flexible material, a mandrel, means for rotating said mandrel, means for supporting a pile of strips of flexible material adjacent to said mandrel, a suction head, an oscillating support for said suction head, means for connecting said suction head with a suction creating device, means for actuating said support to move said suction head into engagement with the uppermost strip on said pile of strips and to then move said strip toward said mandrel, a valve carried by said suction head for controlling the connection between said head and said suction controlling device, means for opening said valve as said head approaches said strip and for closing said valve when said strip has been moved to said mandrel, said mandrel having means for gripping the end of said strip and causing said strip to be wound about said mandrel to form a tube, and means for removing the formed tube from said mandrel.

11. In a machine for forming a tubular structure of flexible material, a mandrel, means for rotating said mandrel, means for feeding a strip of material to said mandrel, said mandrel having means for gripping the forward end of said strip and causing said strip to be wound about the mandrel to form a multi-ply tube, said strip being provided with heat soluble adhesive, a heating roller arranged to engage the wound strip on said mandrel to soften said adhesive and cause adjacent windings to adhere one to the other, a vertically adjustable bearing for said mandrel, an ejecting device movable lengthwise of said mandrel to remove the wound tube therefrom, and supporting and operating means for said ejecting device so arranged that it will automatically accommodate itself to the adjustments of said mandrel.

12. In a machine for forming a tubular structure from flexible material, a mandrel, means for rotating said mandrel, means for feeding a strip of material to said mandrel, said mandrel having within itself means for gripping the forward end of said strip and causing said strip to be wound about the mandrel to form a multi-ply tube, said strip being provided with a dry heat soluble adhesive, heat applying means supported out of engagement with said tube during the initial portion of the winding operation and arranged to engage the tube and soften said adhesive during the final portion of said winding operation, and means operating in timed relation to the mandrel rotating means for removing said tube from the mandrel.

13. In a machine for forming a tubular structure from flexible material, a mandrel, means for rotating said mandrel, means for feeding a strip of material to said mandrel, said mandrel having means for gripping the forward end of said strip and causing said strip to be wound about said mandrel to form a multi-ply tube, said strip being provided with a dry heat soluble adhesive, a heated roller parallel with said mandrel and spaced therefrom such a distance that it will engage said tube and soften said adhesive only during the final portion of the winding operation, and means operating in timed relation to the mandrel rotating means for removing said tube from said mandrel.

14. In a machine for forming a tubular structure from flexible material, a mandrel, means for rotating said mandrel, means for feeding a strip of material to said mandrel, said mandrel having within itself means for gripping the forward end of said strip and causing the same to be wound about said mandrel to form a multi-ply tube, said strip of material being provided adjacent to its respective ends with relatively narrow transverse strips of dry heat soluble adhesive arranged to engage the adjacent windings as said strip of material is wound into tubular form, an internal heated roller parallel with said mandrel and spaced therefrom such a distance that it will engage the tube only after the major portion of said strip has been wound about said mandrel, and means for removing said tube from said mandrel.

15. In a machine for forming tubular structures from flexible material, a mandrel having a longitudinal series of apertures, means for connecting said apertures with a suction creating device, means for rotating said mandrel, a split collar mounted about said mandrel and having its longitudinal edges spaced one from the other and from a plane tangential to that portion of said mandrel which is between said edges, means for imparting reciprocatory movement to said collar, and means for feeding the forward end portion of a strip of material across said mandrel during the reciprocation of said collar, the movement of said collar being so timed with relation to the rotation of said mandrel that said collar will be moved substantially to its initial position before said apertures are moved into operative relation to said strip of material.

16. In a machine for forming tubular structures from flexible material, a mandrel, means for rotating said mandrel, said mandrel having means for gripping a strip of material and causing the same to be wound about said mandrel to form a tube, a plurality of receptacles mounted adjacent one end of said mandrel and movable successively into alinement with said mandrel, means for moving a tube from said mandrel into that receptacle which is alined therewith, means for intermittently actuating said receptacles to move each receptacle to an intermediate position beyond said mandrel, a device supported in a fixed position adjacent the outer end of and in line with the receptacle in said intermediate position to apply a closure to the outer end of the tube in said receptacle, means at the inner end of the receptacle in said intermediate position to prevent the longitudinal movement of the tube therein by said closure applying device, the outer end of said receptacle being open when it has been moved beyond said closure applying device to enable said tube to be ejected through the outer end thereof.

17. In a machine for forming tubular structures from flexible material, a mandrel, means for rotating said mandrel continuously while the machine is in operation, means for continuously withdrawing a web of material from a supply of said material, means for feeding the end portion of said web to said mandrel, said feeding means being normally inoperative to permit slack to accumulate in said web between said withdrawing means and said feeding means, means operating in timed relation to said mandrel for rendering said feeding means operative for an interval sufficient to move the forward end of said web to said mandrel and to then restore said feeding means to its inoperative condition, said mandrel having within itself means for gripping said web and causing the same to be wound about said mandrel, and means operating in timed relation to said mandrel to sever said web in advance of said mandrel when a predetermined portion of said web has been wound on said mandrel.

18. In a machine for forming tubular structures from flexible material, a mandrel, means for rotating said mandrel continuously while said machine is in operation, a main feeding roller, means for continuously rotating said roller, a supplemental roller at one side of said main roller and cooperating therewith to withdraw a web of material from a roll, a pressure roller supported normally in an inoperative position at the other side of said main roller, means operating in timed relation to said mandrel to move said pressure roller into operative engagement with the web on said main roller and maintain such engagement for an interval sufficient to move the forward end of said web to said mandrel and to then move said pressure roller from said main roller to release that portion of said web which has been withdrawn from said roll for movement by said mandrel, said mandrel having means to grip said end of said web and cause the web to be wound about said mandrel, and means operating in timed relation to said mandrel to sever said web in advance of said mandrel when a predetermined portion thereof has been wound on said mandrel.

19. In a machine for forming tubular structures from flexible material, a mandrel, means for rotating said mandrel continuously while said machine is in operation, a main feeding roller, means for continuously rotating said roller, a supplemental roller at one side of said main roller and cooperating therewith to withdraw a web of material from a roll, a pressure roller supported normally in an inoperative position at the other side of said main roller, a cam, means for rotating said cam in timed relation to said mandrel, means controlled by said cam to move said pressure roller into operative engagement with the web on said main roller and maintain such engagement for an interval sufficient to move the forward end of said web to said mandrel and to then move said pressure roller from said main roller to release that portion of said web which has been withdrawn from said roll for movement by said mandrel, said mandrel having means to grip the end of said web and cause the latter to be wound about said mandrel, a spring actuated cutter to sever said web in advance of said mandrel when a predetermined portion of said web has been wound on said mandrel, and means cooperating with said cam to control the operation of said cutter.

20. In a machine for forming tubular structures from flexible material, a mandrel having means for gripping a web of material and winding the same about said mandrel, means for rotating said mandrel continuously at a relatively high speed, web feeding mechanism spaced from said mandrel and comprising a main roller, means for rotating said roller continuously at a speed less than the speed of said mandrel, a supplemental roller cooperating with said main roll to continuously withdraw a web of material from a roll of material, a pressure roller spaced from said supplemental roller, a vertically movable bearing for said pressure roller, a lever connected with said bearing, a cam for actuating said lever to move said pressure roller into engagement with the web on said main roller to cause the forward portion of said web to be moved to said mandrel and to then move said pressure roller from said main roller to release said web, a cutter to sever said web in advance of said mandrel, means for connecting said cutter with said lever to control the operation of said cutter, and means for actuating said cam in timed relation to said mandrel.

21. In a machine for forming tubular structures from flexible material, a mandrel, means for rotating said mandrel, means for supporting a pile of strips of flexible material adjacent said mandrel, a suction head including a conduit, a movable support for said suction head, means for actuating said support in timed relation to said rotating means to move said head into engagement with the uppermost strip of said pile of strips and to then move said head toward said mandrel, means movable with said suction head and controlled by the movement thereof for connecting said conduit with a suction creating device as said head approaches said strip and for interrupting said connection as said head approaches said mandrel, said mandrel having means for gripping the strip advanced by said head and causing the same to be wound about said mandrel to form a tube, and means for removing the wound strip from said mandrel.

22. In a machine for forming tubular structures from flexible material, a mandrel, means for rotating said mandrel, means for supporting a pile of strips of flexible material adjacent said mandrel, a suction head, a movable support for said suction head, means for actuating said support in timed relation to said rotating means to move said head into engagement with the uppermost strip of said pile of strips and to then move said head toward said mandrel, a valve carried by said movable support for connecting said conduit with a suction creating device and having oppositely extending valve stems, parts arranged in the paths of the respective valve stems for actuating said valve to connect said conduit with said suction creating device as said head approaches said strip and to interrupt said connection as said head approaches said mandrel, said mandrel having means for gripping the strip advanced by said head and causing the same to be wound about said mandrel to form a tube, and means for removing the wound tube from said mandrel.

23. In a machine for forming tubular structures from flexible material, a mandrel, means for rotating said mandrel, means for supporting a pile of strips of flexible material adjacent to said mandrel, a suction head including a conduit rigid therewith, a sleeve slidable on said conduit and having a yieldable end portion, and resilient means acting on said sleeve to project said yieldable end portion thereof beyond the end of said conduit, a movable support for said suction head, means for connecting said suction head with a suction creating device, means for actuating said support to move said suction head into engagement with the uppermost strip on said pile of strips and to then move said strip toward said mandrel, said mandrel having means to grip the end of said strip and cause the latter to be wound about said mandrel to form a tube, and means for removing the formed tube from said mandrel.

24. In a machine for forming tubular structures from flexible material, a mandrel, means for rotating said mandrel, means for feeding a strip of flexible material to said mandrel, said mandrel having means to grip the end of said strip and cause the latter to be wound about said mandrel to form a tube, a receptacle adjacent to said mandrel adapted to receive the wound tube from said mandrel, means for applying a closure to one end of the tube in said receptacle while a succeeding tube is being wound on said mandrel, a container for a bath of molten wax, means for moving the closed tube from said receptacle into said container and for moving a succeeding tube from said mandrel into said receptacle, a conveyor for moving said closed tube in the direction of its length through said bath and then upwardly out of said bath with its closed end uppermost to drain the tube, a second conveyor to receive the tube from the first mentioned conveyor and support the same in an upright position with its open end uppermost, means for spraying a cooling medium on said tube as it is advanced by said second conveyor, and operable means for closing the open end of said tube during the spraying operation.

25. In a machine for forming a tubular structure of flexible material, a mandrel, means for rotating said mandrel, means for feeding a strip of material to said mandrel, said mandrel having means for gripping the forward end of said strip and causing the latter to be wound about said mandrel to form a multi-ply tube, said strip being provided with heat soluble adhesive, a heating roller arranged to engage the wound strip on said mandrel to soften said adhesive and cause adjacent windings to adhere one to the other, means for relatively adjusting said mandrel and said roller to accommodate material of different thicknesses, and means for removing the tube from said mandrel.

26. In a machine for forming tubes from flexible material, a mandrel having a longitudinal series of apertures, means for connecting said apertures with a suction creating device, means for continuously rotating said mandrel, a device movable lengthwise of said mandrel to eject a formed tube therefrom, said ejecting device being shaped to expose a longitudinal portion of said mandrel throughout the movement of said device and thus enable the end portion of a web of material to be moved into engagement with said mandrel during the return movement of said ejecting device, means for continuously withdrawing the web of material from a roll of material, means for feeding the end portion of said web to said mandrel, said feeding means being normally inoperative to permit slack to accumulate in the web between said withdrawing means and said feeding means, means for rendering said feeding means operative for an interval sufficient to move the end of said web to said mandrel and for then restoring said feeding means to its inoperative condition, whereby said mandrel will grip said web and withdraw said slack portion thereof as said web is wound on said mandrel, means for severing said web in advance of said mandrel when a predetermined portion thereof has been wound on said mandrel, a plurality of tubular receptacles mounted to revolve about a fixed axis parallel with and adjacent to said mandrel to move said receptacles successively into alinement with said mandrel to receive tubes ejected therefrom, means to intermittently actuate said receptacles, means supported outwardly beyond the path of said receptacles to apply a closure to the outer end of a tube in a receptacle which has moved beyond said mandrel, and means for actuating the aforesaid instrumentalities in timed relation one to the other.

27. In a machine for forming a tubular structure from flexible material, a mandrel, means for continuously rotating said mandrel, means for feeding a strip of material to said mandrel, said mandrel having means for gripping the forward end of said strip and causing the latter to be wound about the mandrel to form a multi-ply type tube, an ejecting device movable lengthwise of said mandrel, and means for actuating said ejecting device to eject a formed tube from said mandrel and to return said ejecting device to its initial position, said ejecting device comprising a split collar extending about said mandrel and having its longitudinal edges spaced one from the other with all parts of said edges below a plane tangential to the mid-portion of said mandrel between said edges, said actuating means being so timed with relation to said strip feeding means that a strip will be moved to gripping position with relation to said rotating mandrel after said formed tube has been ejected and before said ejecting device has completed its return movement.

PAUL C. ELLIOTT.

REFERENCES CITED

The following references are of record in the file of this patent:

UNITED STATES PATENTS

| Number | Name | Date |
|---|---|---|
| 240,542 | Powers | Apr. 26, 1881 |
| 424,953 | Brigham | Apr. 8, 1890 |
| 652,445 | Skofsrud | June 26, 1900 |
| 659,437 | Dixson | Oct. 9, 1900 |
| 868,555 | Hansen | Oct. 15, 1907 |
| 914,384 | Chesney | Mar. 9, 1909 |
| 931,269 | Chesney | Aug. 17, 1909 |
| 935,848 | Jenkins | Oct. 5, 1909 |
| 1,056,291 | Hazel | Mar. 18, 1913 |
| 1,070,933 | Wilson | Aug. 19, 1913 |
| 1,188,432 | Ford | June 27, 1916 |
| 1,221,649 | Arnott | Apr. 3, 1917 |
| 1,271,132 | Chesney | July 2, 1918 |
| 1,439,606 | Coates | Dec. 19, 1922 |
| 1,511,715 | Beadle | Oct. 14, 1924 |
| 1,540,336 | Huyett | June 2, 1925 |
| 1,685,494 | Koch | Sept. 25, 1928 |
| 1,857,002 | Plante | May 3, 1932 |
| 1,922,189 | Angell | Aug. 15, 1933 |
| 1,929,770 | Buist | Oct. 10, 1933 |
| 1,942,345 | Ristow | Jan. 2, 1934 |
| 1,958,413 | Angell | May 15, 1934 |
| 2,085,017 | Funkhouser et al. | June 29, 1937 |
| 2,130,727 | Aument | Sept. 20, 1938 |
| 2,134,914 | Frame | Nov. 1, 1938 |
| 2,155,487 | Hatch | Apr. 25, 1939 |

FOREIGN PATENTS

| Number | Country | Date |
|---|---|---|
| 190,340 | Germany | Oct. 23, 1907 |